(12) United States Patent
Tao

(10) Patent No.: US 10,030,321 B1
(45) Date of Patent: Jul. 24, 2018

(54) EXTRUSION DIE FOR MAKING FILM, FIBERS, AND NANOFIBERS

(71) Applicant: Thomas M. Tao, Greer, SC (US)

(72) Inventor: Thomas M. Tao, Greer, SC (US)

( * ) Notice: Subject to any disclaimer, the term of this patent is extended or adjusted under 35 U.S.C. 154(b) by 0 days.

(21) Appl. No.: 14/850,893

(22) Filed: Sep. 10, 2015

Related U.S. Application Data

(60) Provisional application No. 62/152,903, filed on Apr. 26, 2015.

(51) Int. Cl.
| B29C 47/70 | (2006.01) |
| D01D 4/02 | (2006.01) |
| B29C 47/10 | (2006.01) |
| B29C 47/58 | (2006.01) |
| B29C 47/00 | (2006.01) |
| B29C 47/12 | (2006.01) |
| B29C 47/86 | (2006.01) |
| D01D 5/08 | (2006.01) |
| B29C 47/14 | (2006.01) |

(52) U.S. Cl.
CPC ......... *D01D 4/025* (2013.01); *B29C 47/0014* (2013.01); *B29C 47/1063* (2013.01); *B29C 47/12* (2013.01); *B29C 47/145* (2013.01); *B29C 47/585* (2013.01); *B29C 47/702* (2013.01); *B29C 47/705* (2013.01); *B29C 47/862* (2013.01); *D01D 5/08* (2013.01)

(58) Field of Classification Search
CPC ..... B29C 47/14; B29C 47/145; B29C 47/702; B29C 47/705
See application file for complete search history.

(56) References Cited

U.S. PATENT DOCUMENTS

| 2,734,224 | A | * | 2/1956 | Winstead | B29C 47/14 118/410 |
| 3,020,579 | A | * | 2/1962 | O'Connor | B05C 17/00 118/410 |
| 4,550,681 | A | * | 11/1985 | Zimmer | B05C 5/0254 101/120 |
| 4,708,629 | A | * | 11/1987 | Kasamatsu | B29C 47/0021 118/315 |
| 5,783,129 | A | * | 7/1998 | Shirai | B29B 15/122 156/180 |
| 2004/0265407 | A1 | * | 12/2004 | Prugh | B29C 47/0019 425/133.5 |
| 2012/0273988 | A1 | * | 11/2012 | Eastep | B29B 15/122 264/136 |

* cited by examiner

*Primary Examiner* — Yogendra N Gupta
*Assistant Examiner* — Joseph S Leyson
(74) *Attorney, Agent, or Firm* — Charlotte C. Wilson

(57) ABSTRACT

An extrusion die includes a die body with two mating die halves, at least one of which is engraved with a die cavity system. The die cavity system includes a melt inlet, a first-stage melt reservoir in fluid communication with the melt inlet, a plurality of melt channels extending from the first-stage melt reservoir, and an extrusion trough in fluid communication with the melt channels and extending across the die half. Multiple stages of reservoirs and channels may be used. The melt channels in each stage have an equal length and cross-sectional area. Some of the melt channels may have a curved portion to maintain an equal length with other melt channels in the same stage. The die halves are secured by a plurality of fasteners. A method for extruding a fluid using the die is also provided. The die may be used to create films or fibers, including nano-fibers.

5 Claims, 5 Drawing Sheets

- FIG. 1 -
PRIOR ART
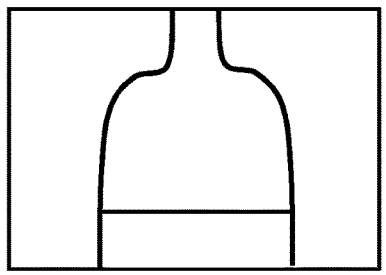
CAVITY DIE
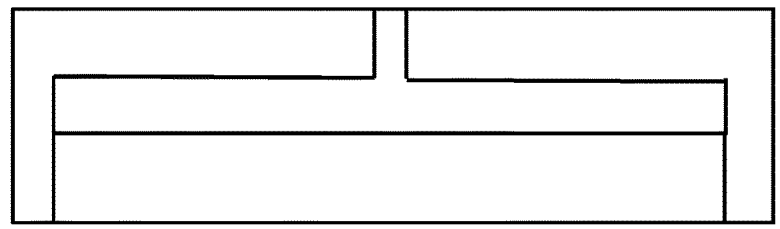
SLOT DIE
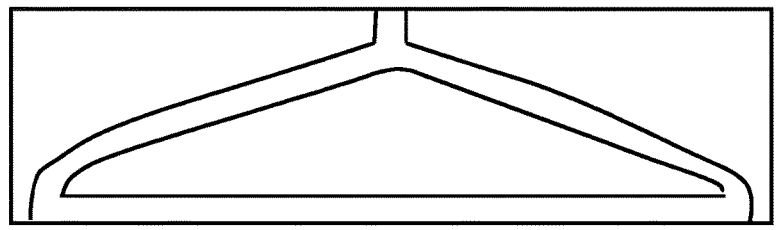
LINEARLY TAPERED DIE
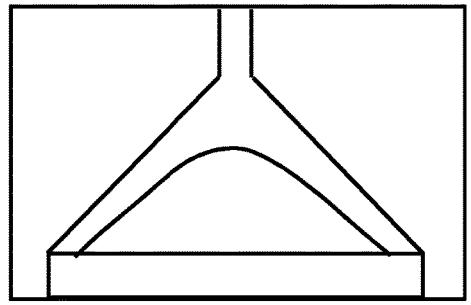
FISHTAIL DIE

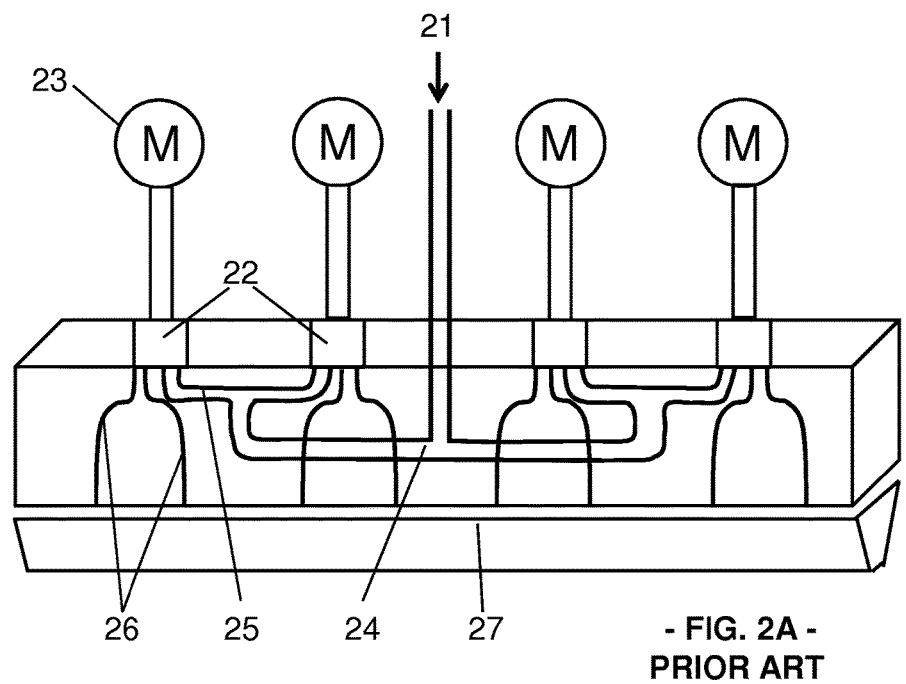
- FIG. 2A -
PRIOR ART
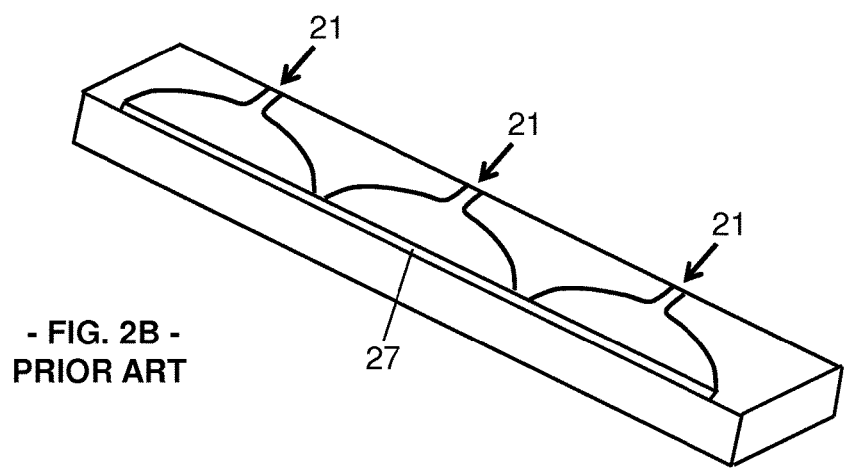
- FIG. 2B -
PRIOR ART

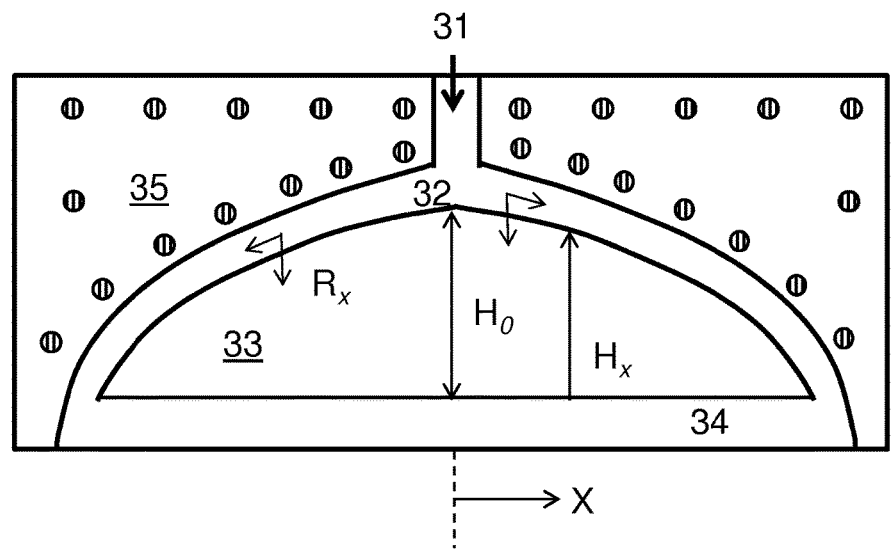
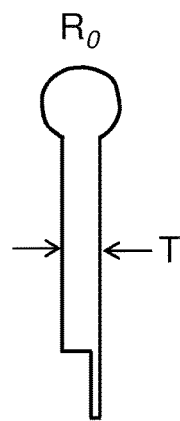
- FIG. 3 -
PRIOR ART

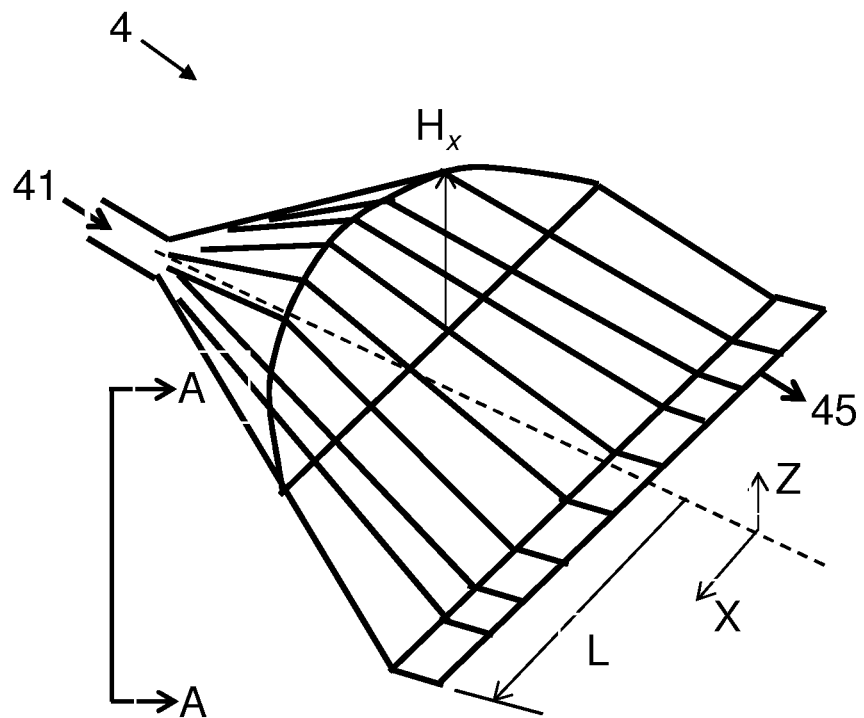
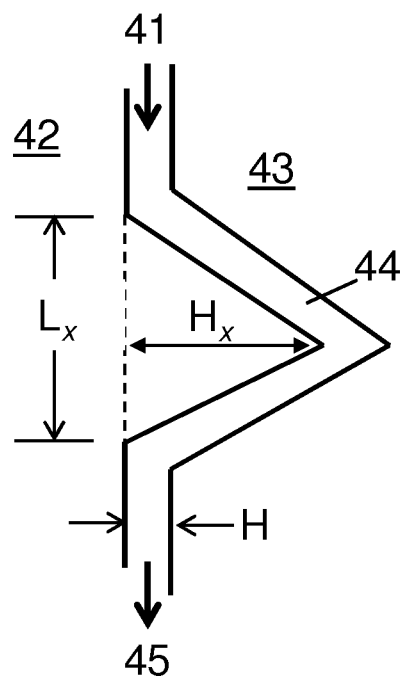
- FIG. 4 -
PRIOR ART
A-A VIEW

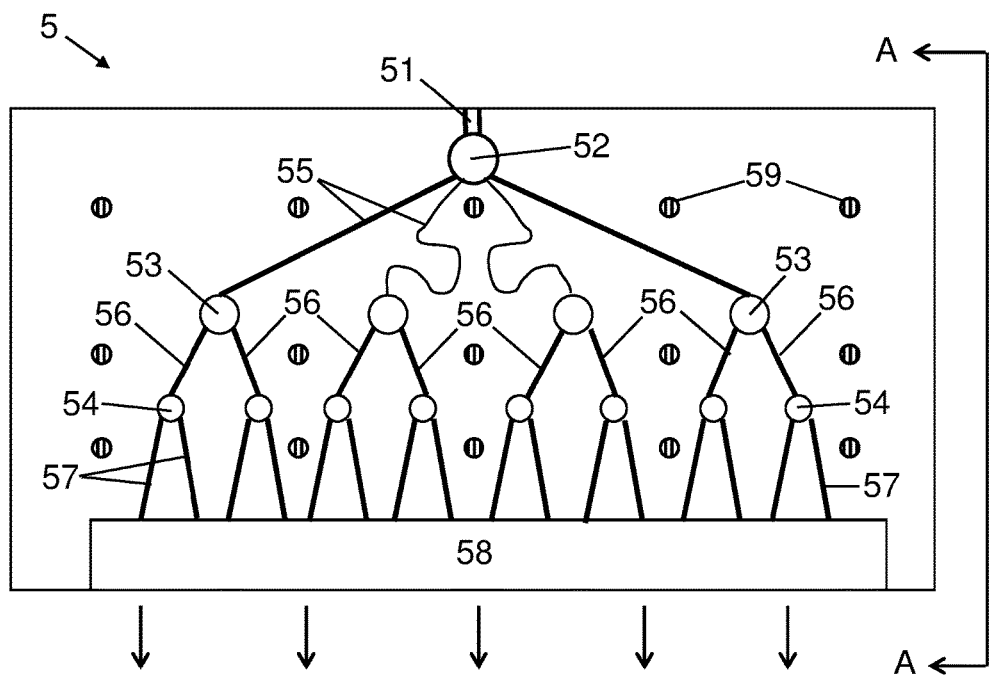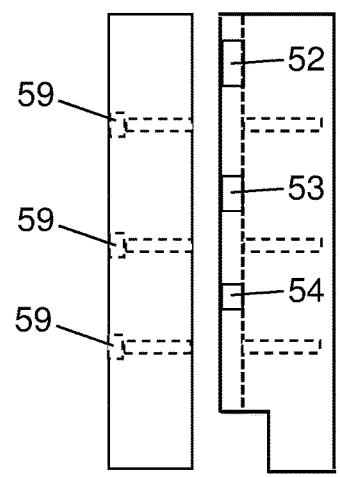
- FIG. 5 -
A-A VIEW

EXTRUSION DIE FOR MAKING FILM, FIBERS, AND NANOFIBERS

CROSS-REFERENCE TO RELATED APPLICATIONS

This application is a non-provisional application, which claims benefit of U.S. Provisional Application Ser. No. 62/152,903, filed Apr. 26, 2015, the entire disclosure of which is hereby incorporated by reference herein.

TECHNICAL FIELD

This disclosure relates to a device for the extrusion of various polymeric products, such as films, membranes, sheets, boards, adhesives, coatings, particle-laden fluids, and blown fibers. By way of example and not limitation, the disclosure is directed to a device for the production of fibers and nonwoven webs through a process known as "melt-blowing." More particularly, this disclosure is concerned with a fluid-spreading device used in extrusion operations, which is commonly known as an "extrusion die" or simply a "die."

BACKGROUND

Films, membranes, sheets, boards, adhesives, coatings, particle-laden fluids, blown fibers and the like are formed by an extrusion process including an extrusion die (also known as a "flat die" or, simply, a "die"). The extrusion die includes a cavity into which a prepared fluid or paste (such as a polymer melt) flows. The die cavity is configured to create substantial cross-directional (CD) uniformity in flow rate and temperature. Sometimes, additional criteria, such as residence time, shear rate, and shear history, are important, because these criteria influence the molecular weight and poly-dispersity of the material. After flowing through the die cavity, the fluid exits the die through a gap opening as a uniform sheet or through a row of orifices as liquid filaments ready for further treatments.

Designing a die cavity geometry requires one to make use of rheological principles and knowledge of the properties of the material. A wide variety of materials may be used in the extrusion process. Newtonian fluids are those materials having fluid properties that are unaffected by flow parameters. There is no shortage of die designs for extruding Newtonian fluids.

Some of the materials have large and complex molecular structures and properties that change with surroundings and treatments, such as molten thermoplastic and thermo-set polymers. Their flow behaviors are of the non-Newtonian type, in which material properties (such as viscosity, density, and molecular weight) and flow dynamics (such as shear rate, shear history, temperature, thermal history, heat transfer rate, and pressure) influence each other. For non-Newtonian fluids, some extent of material degradation at the end of processing is unavoidable and irreversible. However, such degradation may be minimized and made uniform by utilizing a properly designed die. The fabrication of dies also requires specialized skill, experience, and equipment.

Unfortunately, for molten polymers and other non-Newtonian fluids, there are few suitable die choices. FIG. 1 illustrates several conventional die types, including a simple cavity die 11, a slot die 12 having a T-shape, a linearly tapered die 13, and a fishtail die 14. FIG. 3 illustrates a so-called "coat hanger" die 3, which is commercially popular.

FIGS. 2A and 2B illustrate an extrusion assembly for producing wide webs. For expedience and savings, several narrow dies may be arranged abutting one another in their width direction, as taught by U.S. Pat. No. 7,438,544 and U.S. Pat. No. 7,690,902. In such an assembly, fluid materials are introduced via a melt inlet 21. Fluid delivery pipes 24, 25 direct the fluid materials through melt pumps 22, which are powered by melt pump motors 23. The melt pumps 22 push the fluid material through a series of melt reservoir supply pipes 26 and into a melt reservoir 27. From the melt reservoir 27, the fluid materials are extruded as a film, a web, or a plurality of fibers. Such an assembly has sub-par uniformity, and capital and operating costs associated with such an assembly are high. Thus, this technique has limited practical merit.

FIG. 3 is one half of a conventional coat hanger die 3 having a melt inlet 31 and a coat hanger flow channel 32 that surrounds a land area 33. The fluid material flows through the arc-shaped flow channel 32 and is extruded through an extrusion trough 34. The die halves are secured by assembly fasteners 35, such as bolts or screws, which are located upstream of the flow channel 32 and outside of the land area 33. One representative example of such a conventional coat hanger die is found in U.S. Pat. No. 4,285,655.

The formula for the geometry of the coat hanger die is derived from solving differential equations of the polymer's rheological formula while incorporating boundary conditions and desired states, such as nominal melt velocity at the center, equal flow and shear rates in the cross-machine direction, equal residence time and shear history along each streamline, and lack of slip at the walls. As a result, the shape looks like a coat hanger (thus, the name) with a round- or teardrop-shaped flow channel (32). After simplification and approximation, the radius of the channel $R_x$ and its position $H_x$ can be expressed by the following short formulas:

$$R_x = R_0 \left(\frac{x}{L}\right)^{1/3}$$

$$H_x = H_0 \left(\frac{x}{L}\right)^{2/3}$$

In these formulas, x represents a location along the width of the die, as measured from an outermost edge of the die. The "L" in the formulas is a constant for a given die, which is equal to one-half of the maximum width of the die. The maximum radius $R_o$ and the maximum die height $H_o$ are constants usually recommended by experienced die builders. These formulas have been widely used by extrusion industries for several decades.

Worldwide users have had considerable experience with coat hanger dies, and they generally have expressed the following comments or suggestions for improvement. In no particular order, their comments include:

1. The coat hanger die is bulky and heavy. For example, a die having a width of one meter weighs about one ton.

2. The coat hanger die is expensive and difficult to make and repair. Typically, the coat hanger die is made from vacuum furnace-fused tool steel (for purity), which has been treated for chemical resistance and hardness. The machining and polishing of three-dimensional cavities within the die require sophisticated equipment and skills.

3. The land area 33 of the coat hanger die 3 cannot accommodate bolts or screws. Lacking support, the coat hanger die 3 bulges under pressure to a shape that, when exaggerated, resembles a clamshell. The resulting clamshell shape reduces the uniformity of all flow parameters and is particularly problematic for wide dies. It is very difficult to monitor and alleviate the "clamshell effect," which is a function of pressure and die's design and age.

4. Overheating, uneven heating, over pressure, and mechanical impact or scratches can damage a die and upset production.

5. Coat hanger dies with greater heights $H_o$ yield better uniformity results. But die height drives up die size, weight, and cost. Compromises must be made in the use of such wide dies with the number of compromises being higher with increasing die widths.

6. In reality, coat hanger dies are not sufficiently indiscriminating to different polymeric materials. While some material changes cause only minor differences in resulting uniformity, others may not be so negligible. The lack of uniformity causes concern to production lines that switch raw materials often, since wide dies are too inconvenient to be moved in and out from a production line frequently and are too expensive to remain idled.

7. The polymer species most commonly used for blown fibers are polypropylene, polyethylene, polyethylene terephthalate (PET), and linear polyamides, which are more sensitive to heat and shear than other polymers. When making fibers, these polymers need to be processed with higher temperature and lower viscosity than are used in film/sheet extrusion, in order to get acceptable throughput from tiny orifices. Issues such as thermal degradation, shear thinning, and residence time effect are more critical in making fibers than films. Thus, the need for a suitable die is more critical, and achieving a satisfactory result takes more trial-and-error effort.

8. In the mathematical derivation of the coat hanger-shaped geometry, assumptions and approximations lead to inaccuracy. For example, the streamlines in a large coat hanger's land area may not always be straight and parallel; actual melt viscosity may deviate from the simplified laws (such as Power law and Eyring law); and melt pressure and speed may also affect viscosity.

9. For the above reason, die makers must test and analyze the material(s) to be extruded with their proprietary computer programs before they design the die cavity geometry. Similarly, polymer suppliers tailor their resins or additives with their proprietary formulations to optimize the polymer's performance in coat hanger dies. Such customization increases cost, time, and inconvenience.

10. Not reflected in its mathematical formula, coat hanger dies have been empirically found to have varied uniformity results for changes in melt temperature, flow rates, and polymer species. The deviations are more pronounced at and near the edges.

11. The two edges of the extruded sheet are routinely too light or too thick, even at normal operating conditions. As a result, manufacturers treat the edges as off-quality. As such, the manufacturers trim off the edges and recycle the polymeric material.

12. During maintenance, a purging compound is extruded through the entire cavity inside the flat die. Because the purging compound is vastly different from the polymer melt in both composition and flow rate, the purging compound cannot be expected to scour the die cavity uniformly.

13. Intervention systems (such as automatic lip, choker bar, and computerized temperature manipulation systems) are commonly needed to improve the flow profile of wide dies, but at the cost of shear rate and shear history uniformity. These remedial equipments and operations also add considerable cost, skill, labor, maintenance and downtime.

Despite its challenges, the coat hanger die design represents a substantial advantage over its predecessors. There have been few challengers to this die type. One such challenger is F. Rothemeyer, whose proposed die assembly was published originally in German in an article entitled "Bemessung von Extrusionswerkzeugen" in the journal *Maschinenmarkt*, Vol. 39, pages 679-685 (1979) and whose work was subsequently described in English by W. Michaeli in *Extrusion Dies for Plastics and Rubber*, 2$^{nd}$ edition, Hanser Publishers, pages 147-152 (1992). A sketch of this die is shown in FIG. 4.

The Rothemeyer die 4 is constructed with a three-dimensional shape that ensures each flow path within the die cavity 44 has an equal length, such that they have an identical flow rate and flow history. The polymer melt enters the die 4 through a melt inlet 41 and travels through the die cavity 44 between the lower half 42 of the die and the upper half 43 of the die. The polymer exits through an extrusion trough 45. The performance of the die 4 is independent of the material being processed and the operating parameters of the extrusion system.

Many of the drawbacks of the proposed die are associated with its large three-dimensional shape. The material requirements and steel waste are also high. The cavity 44 is difficult to machine, and the labor requirements are high. The programming and set-up for CNC milling are time-consuming. Finally, it is possible that the "clamshell" concern might actually be worse, not better, than that of existing coat hanger dies. For these reasons, there appears to be no evidence of the commercial use of this die.

Therefore, an improved die design would benefit a vast number of users and end products. It would be even more useful if the die design is capable of processing Newtonian and non-Newtonian fluids equally well. It is a scope of this disclosure to provide as many as possible improvements or reliefs to the aforementioned needs.

A second, but equally significant, challenge unmet by conventional dies is the ability to withstand pressures associated with the production of very small diameter (e.g., nano-scale) fibers. A micron is one-millionth of a meter. The term "nano-fibers" is used to describe fibers having an average diameter size measured in nanometers (nm), or one-billionth of a meter. The term "submicron fibers" refers to fibers having an average diameter size of between 500 and 999 nm. Nano-fibers having an average diameter of between 100 and 500 nm and submicron fibers having an average diameter of between 500 and 999 nm are of particular commercial interest and are difficult to obtain using presently available dies and die tips.

Since the introduction of very small fibers, they have been used in numerous new applications, such as biomedical (e.g., synthetic tissues, organs, skin, blood vessels; wound healing; drug release; metal ion adsorption for detoxification), carriers for enzymes and catalysts, sensors, weapons and warfare, environmental protection, water/gas filtration and purification, personal protection/care, energy devices (e.g., lithium batteries, super capacitors, fast chargers, solar cells, fuel cells, hydrogen and natural gas storage/transportation, renewable energy harvest and storage, electric vehicles), electronics, membrane replacements, and the like.

In the production of very fine fibers, such as submicron and nano-fibers, melt-blowing competes with electro-spin technology. Electro-spin technology has successfully produced fibers as fine as 100 nm in tiny quantities, while the best available melt-blowing devices are capable of producing slightly coarser fibers ranging from 350 to 500 nm with greater economy. Accordingly, both technologies have a potential for advancement and would benefit from improvements thereto.

Recent studies and the inventor's experience suggest that the major impediments to creating melt-blown nano-fibers (less than 500 nm) are the currently available die and the die tip. Conventional dies and die tips used for extruding melt-blown fibers are unable to process melts of super low viscosity and are unable to withstand the extremely high pressures required for very small orifices. For example, conventional dies (such as those discussed above) and die tips are typically designed for pressures of about 600 psi to 900 psi (pounds per square inch), whereas pressures of 3,000 psi or greater may be necessary for producing very fine fibers. The low melt viscosity is needed for spinning super thin fibers, while the high pressure is required to afford a reasonable production rate. Conventional dies "clamshell" tendency worsens seriously with greater pressure and die width. Additionally, because many nano-fiber types must be made from difficult-to-process and rare polymer species, extrusion dies are needed that are indiscriminating to all materials in all process conditions. Current coat hanger dies fall short on all these critical requirements.

Therefore, another object of the present disclosure is to provide a die design capable of producing fibers of a very small diameter, including nano-fibers.

The problem with conventional die tips is that they simply do not have orifices that are small enough to produce the target fiber size. The present state-of-the-art die tip equally would benefit from improvements to address its own shortcomings. Such an improved die tip is subject of another disclosure by the present inventor, U.S. patent application Ser. No. 14/850,877, entitled "DIE TIP FOR MELT BLOWING MICRO AND NANO-FIBERS," filed concurrently herewith and incorporated in its entirety by reference herein.

SUMMARY

An extrusion die includes a die body with two mating die halves, at least one of which is engraved with a die cavity system. The die cavity system includes a melt inlet, a first-stage melt reservoir in fluid communication with the melt inlet, a plurality of melt channels extending from the first-stage melt reservoir, and an extrusion trough in fluid communication with the melt channels and extending across the die half. Multiple stages of reservoirs and channels may be used. The melt channels in each stage have an equal length and cross-sectional area. Some of the melt channels may have a curved portion to maintain an equal length with other melt channels in the same stage. The die halves are secured by a plurality of fasteners. A method for extruding a fluid using the die is also provided. The die may be used to create films or fibers, including nano-fibers.

A method for extruding a fluid using the die is also provided. The method includes providing a die body having a first die half and a second die half, the first die half and the second die half each having a mating surface; securing the first die half to the second die half using a plurality of fasteners; and directing a fluid flow through the die body from the melt inlet through the first-stage melt reservoir and the melt channels to the extrusion trough. A die cavity system is engraved onto the mating surface of at least one die half. The die cavity system includes a melt inlet, a first-stage melt reservoir in fluid communication with the melt inlet, a plurality of melt channels extending from the first-stage melt reservoir, and an extrusion trough in fluid communication with the melt channels and extending across the die half. The melt channels have an equal length and cross-sectional area, and at least some of the melt channels have a curved portion to maintain an equal length with other melt channels in the same stage.

The present die provides several advantages over conventional dies. The flow uniformity is high for all materials and flow parameters. The pressure tolerance of the present die is greatly increased, as compared with conventional dies, making it suitable for use in extruding a wide variety of products, including nano-fibers. The higher pressure tolerance also reduces the tendency of the die "clamshell" phenomena. Design and fabrication are easier, leading to shorter manufacturing times and costs. Finally, wide dies no longer need large heights and massive bodies.

BRIEF DESCRIPTION OF THE FIGURES

A full and enabling disclosure of the present products and methods, including the best mode thereof, directed to one of ordinary skill in the art, is set forth in the specification, which makes reference to the appended figures, in which:

FIG. 1 is a cross-sectional view of several flat die types of the prior art, which preceded the state-of-the-art coat hanger die of FIG. 3;

FIG. 2A is a cross-sectional view of an extrusion die for producing wide sheets, according to the prior art;

FIG. 2B is a perspective view of an extrusion die for producing wide sheets, according to the prior art;

FIG. 3 is a cross-sectional view of a conventional coat hanger die and its bolt pattern, according to the prior art;

FIG. 4 includes a perspective view and a cross-sectional view of a three-dimensional die, according to the prior art; and FIG. 5 is a cross-sectional view of an extrusion die and its bolt pattern, according to the present invention.

Their elements and reference numbers are listed in TABLE 1 below.

TABLE 1

Component List for Figures

| FIG. 1 - prior art | | | |
|---|---|---|---|
| 11 | cavity die | 13 | linearly tapered die |
| 12 | slot die | 14 | fishtail die |
| FIG. 2A, 2B - prior art | | | |
| 2 | extrusion system | 24 | melt flow delivery pipes |
| 21 | polymer melt inlet | 25 | melt flow delivery pipes |
| 22 | melt pumps | 26 | melt reservoir supply pipes |
| 23 | melt pump motors | 27 | melt reservoir |
| FIG. 3 - prior art | | | |
| 3 | coat hanger die | $H_o$ | maximum height of channel 32 |
| 31 | melt inlet | $H_x$ | height of channel at location X |
| 32 | coat hanger flow channel | $R_o$ | maximum radius of channel 32 |
| 33 | coat hanger land area | $R_x$ | radius of channel at location X |
| 34 | coat hanger extrusion trough | T | constant depth of land area 33 |
| 35 | assembly fasteners | | |
| FIG. 4 - prior art | | | |
| 4 | three-dimensional die | H | constant height of die cavity 44 |
| 41 | melt inlet | $H_o$ | maximum height of cavity 44 |
| 42 | lower half of die | $H_x$ | height of die at location X |
| 43 | upper half of die | L | length of half the die |
| 44 | die cavity | $L_x$ | length from outermost corner |
| 45 | extrusion trough | | to a given location "X" |
| FIG. 5 - present invention | | | |
| 5 | extrusion die | 55 | first stage melt channels |
| 51 | melt inlet | 56 | second stage melt channels |

TABLE 1-continued

Component List for Figures

| 52 | first stage melt reservoir | 57 | third stage melt channels |
| 53 | second stage melt reservoirs | 58 | extrusion trough |
| 54 | third stage melt reservoirs | 59 | assembly fasteners |

DETAILED DESCRIPTION

Reference will now be made in detail to embodiments of the inventive products and methods, one or more examples of which are illustrated in the drawings. The detailed description uses numerical and letter designations to refer to features in the drawings. Like or similar designations in the drawings and description have been used to refer to like or similar parts of the invention. As used herein, the terms "first," "second," and "third" are used to signify the relative location of the individual components.

Each example is provided by way of explanation of the invention, not limitation of the invention. In fact, it will be apparent to one of ordinary skill in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as fall within the scope of the appended claims and their equivalents.

This disclosure is directed to a new extrusion die design. Its body, like that of conventional flat dies, consists of large metal halves secured by assembly fasteners, such as bolts, screws, clamps, or other suitable means. The large mass of the die body is configured to accommodate multiple heaters, such as computer-controlled cartridge heaters. Alternately, the die body may be provided with hot oil cavities in lieu of electric cartridge heaters. With either heat source, the die is configured to maintain thermal stability and uniformity throughout the die, which may be advantageous for many material types, such as polymer melts. However, the die need not be heated for all materials contemplated herein.

FIG. 5 illustrates the geometry of one half of an extrusion die 5, according to the present disclosure. In one embodiment, at least one half of the die 5 is engraved, on its mating surface, with a die cavity system that includes a plurality of melt reservoirs 52, 53, 54 arranged in successive stages; an extrusion trough 58 extending across the width of the die 5; and a plurality of melt channels 55, 56, 57 extending between the melt reservoir stages and the trough 58. In another embodiment (not shown), the mating surface of each die half is engraved with the die cavity system.

The melt reservoirs 52, 53, 54 are round, or nearly round, and have diameters decreasing in size from stage-to-stage. The melt reservoirs 52, 53, or 54 may have a shape with a curved portion, such as a circle, oval, or teardrop, or may have another polygonal shape, such as a triangle, rhombus, square, hexagon, or the like. The present disclosure should not be read as limiting the melt reservoirs 52, 53, or 54 to any particular shape, diameter, or depth. Likewise, the melt channels are not limited to a particular dimension or depth, other than that the melt channels of a particular stage have a uniform length and cross-sectional area.

In operation, a polymer melt, a polymer solution, or non-polymeric fluid enters the die 5 via a melt inlet 51, which directs the flow into a first stage melt reservoir 52. For convenience, further reference will be made to a polymer melt, but it should be understood that other materials or solutions may instead be used.

In the illustrated embodiment, a plurality of first stage melt channels 55 connects the first stage melt reservoir 52 to a number of second stage melt reservoirs 53 located downstream of the first stage melt reservoir 52. The second stage melt reservoirs 52 are evenly spaced across the die 5 in the cross-machine direction. A plurality of second stage melt channels 56 connects the second stage melt reservoirs 53 to a plurality of third stage melt reservoirs 54, the number of third stage melt reservoirs 54 being larger than the number of second stage melt reservoirs 53. The third stage melt reservoirs 54 also are evenly spaced across the die 5 in the cross-machine direction.

A plurality of third stage melt channels 57 connects the third stage melt reservoirs 54 to an extrusion trough 58. The extrusion trough 58 extends across the entire working width of the die 5. The extrusion trough 58 may be a simple slot, as shown, that deposits material onto a rotating roll or drum to form a film or sheet of polymeric material. Alternately, the extrusion trough 58 may feed a die tip having a plurality of orifices to produce fibers. The orifices may have any diameter in a wide range of sizes for producing fibers over a wide diameter range, even as small as nanofibers.

The halves of the die 5 are secured uniformly by assembly fasteners 59, such as bolts or screws, which are evenly spaced across the entire die, including throughout the land area. A gasket (not shown) may be positioned between the die halves to seal the assembly. When necessary, a melt channel (e.g., 55) includes a curved portion to direct flow around one of the assembly fasteners 59. One or more curved portions may be incorporated in the melt channels. Within each stage, the melt channels have an identical length and cross-sectional area. The length of the connecting channels includes any additional length in the curved portion.

It may be possible to use simple channels 55, 56, 57 to split the flow without the reservoirs 52, 53, 54. However, the use of reservoirs 52, 53, 54 helps to eliminate the momentum of the inflow and to redistribute the polymer flow more evenly. Moreover, the costs of engraving the small reservoirs 52, 53, 54 are relatively small.

Because of the very low Reynolds numbers of the flows in the channels (i.e., low speed, small cross sectional area, and high viscosity) and the large ratio of turning radius to channel diameter, the mild curved portions do not affect the flow pattern or material property of the melt. Also, the narrow channels and small reservoirs expose only small areas to the pressure of the melt. Such an approach contrasts with that of the coat hanger die of FIG. 3, in which the entire cavity 33 is subject to melt pressure without help of screws or bolts.

While shown as a relatively flat die, it should be understood that the die may instead have a curved or arc shape, for example, to accommodate neighboring equipment.

It should be understood that the number of stages of reservoirs and melt channels may be chosen based on the width of the desired product and/or the width of the other equipment available. For instance, if a narrow width is desired, a single melt reservoir and corresponding melt channels may be used, whereas larger widths may benefit from the use of three or more stages of reservoirs and corresponding melt channels.

The new design accomplishes several significant advantages including the following:

1. The labor, time and cost for fabricating a die are greatly reduced.

2. The performance of the cavity of the present die is independent of the fluid types and their flow parameters, such as speed, pressure, temperature, shear, and the like. The present die may be used for both Newtonian and non-Newtonian fluid flows. Also, this design uses no assumptions or simplifications.

3. The present die minimizes the collective cavity area that is exposed to melt pressure, so the die has high pressure tolerance and production capacity. Additionally, the die has greater strength, because its fasteners are distributed evenly across the die. The fasteners neither block the melt flow nor affect its uniformity. The combined increase in pressure tolerance is not incremental but exponential.

4. The present die achieves uniformity in the necessary criteria of melt flow rate, shear rate, residence time, and shear history. In contrast, conventional coat hanger dies often compromise some of the criteria in order to honor the others.

5. Products created using the present die have fewer edge problems than those created by the conventional dies discussed herein. For example, the mathematical theory and assumptions employed by convention coat hanger dies cannot keep their validity at and near the far edges of the die, because the geometry and flow pattern are too different from those in the center regions. In addition, the melt stream lines in a coat hanger die cavity are not restrained from lateral movement, and all of the stream lines have a lateral velocity component as the polymer enters the coat hanger channel. Larger cavities are more likely to cause stream lines that experience lateral movements. Generally, the unpredictable lateral movements may affect uniformity and, more particularly, may cause edge humps or depressions. In contrast, the present die has flow paths that are equal in the cross-machine direction (that is, from the center to the edges). All of the channels have the same length, cross-sectional area, shape, velocity, resistance, flow time, shear rate, and shear history, and the polymer streams have no chance to move laterally to influence neighboring stream lines.

6. The present die is flexible and versatile for users to meet their own needs and situations. For example, one may choose the stage of reservoirs from one to any other larger numbers, may produce the die in a broad range of die width and height, or even may consider whether to have the die curved or bent. The work principles of this disclosure remain true unconditionally.

7. The present channel-and-reservoir approach is particularly beneficial for wide dies, because this approach needs less die height than do conventional wide dies, and the pressure tolerance of the present die does not diminish with increases in width or height. In contrast, conventional wide dies need more height, leading to corresponding increases in size, weight, and cost. Their large die cavities reduce the pressure tolerance of the die. Also, conventional wide dies have relatively poor flow uniformity, because the melt flow has too much freedom of lateral movement within the large cavity. The present die with its channels and reservoirs overcomes these problems.

8. By this invention, the die cavity system (reservoirs and their connecting channels) spreads out over a large percentage of the die's inner surface (FIG. 5), so the melt in the cavity receives heat from the die body more evenly and efficiently than it would in a conventional die cavity. Also because of this reason the entire die can have a more even temperature, which benefits product quality and energy efficiency.

9. With its superior and versatile capabilities with pressure, viscosity, and materials, the present die design helps to realize the mass production of very fine nanofibers (such as smaller than 100 nm) and at reduced costs over conventional dies.

The preceding discussion only illustrates the principles of the present invention. It will be appreciated that those skilled in the art may be able to devise various arrangements, which, although not explicitly described or shown herein, embody the principles of the invention and are included within its spirit and scope. Furthermore, all examples and conditional language recited herein are principally and expressly intended to be for educational purposes and to aid the reader to understand the principles of the invention and the concepts contributed by the inventor to furthering the art and are to be construed as being without limitation to such specifically recited examples and conditions. For example, the number, shape, sizes and location pattern of said reservoirs, channels and screws may vary in infinite ways for to fit various circumstances, but they still fall within the teaching and spirit of the invention.

Moreover, all statements herein discussing principles, aspects, and embodiments of the invention, as well as specific examples thereof, are intended to encompass both structural and functional equivalents thereof. Such equivalents include both currently known and equivalents developed in the future, i.e., any elements developed that perform the same function, regardless of structure. Terms such as "width direction", "cross direction", "CD", "screws", "bolts", "polymeric melt", "fluid", "reservoirs", "channels" and "die halves" are intended only to aid in the reader's understanding of the principles and drawings and are not to be construed as limiting the invention being described to any particular orientation, matter or configuration, unless recited in the claims.

This description of the exemplary embodiments is intended to explain the new design in connection with the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

The exemplary embodiments may be described in claims such as those appended hereto.

What is claimed is:

1. An extrusion die comprising:
   a first die half and a second die half, the first die half and the second die half each having a mating surface, the mating surfaces contacting one another and joined together by a plurality of fasteners spaced across the die;
   a die cavity system engraved onto the mating surface of at least one die half, the die cavity system comprising:
   a melt inlet being located at an upstream end of the at least one die half;
   an extrusion trough disposed across a majority of a width of the die at a downstream end of the at least one die half, the extrusion trough being in flow communication with the melt inlet and defining a continuous outlet from the die;
   a first reservoir in flow communication with the melt inlet and having a first cross section parallel to the mating surface of the at least one die half, the first cross section defining a first reservoir curved portion having a first diameter;
   more than two second reservoirs downstream of the first reservoir, each second reservoir of the more than two second reservoirs having a second cross section parallel to the mating surface of the at least one die half, the second cross section defining a second reservoir curved portion having a second diameter smaller than the first diameter;

more than two first melt channels of a first equal length, each first melt channel connecting the first reservoir cured portion to a respective one of the second reservoirs, at least a first of the more than two first melt channels comprising a curved portion and at least a second of the more than two first melt channels defining a straight flow path; and a plurality of second melt channels of a second equal length extending from the respective second reservoir curved portions.

2. The extrusion die of claim 1, further comprising:

a plurality of third reservoirs downstream of the more than two second reservoirs, each third reservoir of the plurality of third reservoirs being in flow communication with a respective one of the plurality of second melt channels, each third reservoir having a third cross section parallel to the mating surface of the at least one die half, the third cross section defining a third reservoir curved portion having a third diameter smaller than the second diameter; and a plurality of third melt channels of a third equal length connecting the plurality of third reservoirs to the extrusion trough.

3. The extrusion die of claim 2, wherein a number of third reservoirs in the plurality of third reservoirs is greater than a number of second reservoirs in the more than two second reservoirs.

4. The extrusion die of claim 2, wherein the first reservoir, the more than two second reservoirs, and the plurality of third reservoirs each have a circular shape, the circular shape being engraved in the mating surface of the at least one die half.

5. The extrusion die of claim 1, wherein the die cavity system is engraved on the mating surface of both the first die half and the second die half.

* * * * *